United States Patent
Jain et al.

(10) Patent No.: US 12,298,739 B2
(45) Date of Patent: May 13, 2025

(54) METHOD AND SYSTEM FOR MICRO-CLIMATE MANAGEMENT

(71) Applicant: Tata Consultancy Services Limited, Mumbai (IN)

(72) Inventors: Prachin Lalit Jain, Thane (IN); Sanket Junagade, Thane (IN); Sanat Sarangi, Thane (IN); Srinivasu Pappula, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 362 days.

(21) Appl. No.: 17/661,921

(22) Filed: May 4, 2022

(65) Prior Publication Data

US 2023/0033389 A1    Feb. 2, 2023

(30) Foreign Application Priority Data

Jun. 29, 2021    (IN) .............................. 202121029175

(51) Int. Cl.
    *G05B 19/4155*    (2006.01)

(52) U.S. Cl.
    CPC .............. *G05B 19/4155* (2013.01); *G05B 2219/37375* (2013.01)

(58) Field of Classification Search
    CPC ...... G06F 16/285; G06F 16/35; G06F 16/355; G06F 17/18; G06F 16/248; G06F 16/9024; G06F 16/29; G06F 16/906; G06Q 30/0202; G06Q 10/063; G06Q 50/06; G06Q 50/02; G06Q 10/06375; G06Q 10/0633;
    (Continued)

(56) References Cited

U.S. PATENT DOCUMENTS

| | | | | |
|---|---|---|---|---|
| 5,842,189 A | * | 11/1998 | Keeler | G06N 3/049 |
| | | | | 706/21 |
| 7,069,258 B1 | * | 6/2006 | Bothwell | G01W 1/10 |
| | | | | 706/15 |

(Continued)

FOREIGN PATENT DOCUMENTS

| CN | 104880225 A | 9/2019 |
|---|---|---|
| EP | 3046066 A1 | 7/2016 |

OTHER PUBLICATIONS

Redmond R. Shamshiri et al., "Model-based evaluation of greenhouse microclimate using IoT-Sensor data fusion for energy efficient crop production," Journal of Cleaner Production, Aug. 2020, vol. 263, Elsevier, https://www.researchgate.net/publication/340543301_Model-based_evaluation_of_greenhouse_microclimate_using_IoT-Sensor_data_fusion_for_energy_efficient_crop_production/link/5e9880d892851c2f52a87368/download.

(Continued)

*Primary Examiner* — Darrin D Dunn
(74) *Attorney, Agent, or Firm* — FINNEGAN, HENDERSON, FARABOW, GARRETT & DUNNER LLP

(57) ABSTRACT

State of the art systems used for monitoring of land (for example, agricultural land), fail to accurately assess various conditions in the land area and make predictions. The disclosure herein generally relates to agricultural systems, and, more particularly, to a method and system for micro-climate management in a land area being monitored. The system groups the different plots based on sensor trend information and based on a determined homogeneity information. A micro-climate view of the land area is accordingly generated, which in turn is used to generate micro-climate predictions.

3 Claims, 11 Drawing Sheets

(58) Field of Classification Search
CPC ............ G06Q 10/06393; A01B 79/005; A01B 69/008; G05B 13/048; G05B 23/0221; G05B 23/0254; G05B 2219/2642; Y02A 40/10; Y02A 90/10
See application file for complete search history.

(56) References Cited

U.S. PATENT DOCUMENTS

| | | | |
|---|---|---|---|
| 10,255,391 | B2 | 4/2019 | Mewes et al. |
| 11,450,039 | B2* | 9/2022 | Chen ................. G06T 11/206 |
| 11,544,296 | B1* | 1/2023 | Krishnan ................ G06F 16/29 |
| 2002/0173980 | A1* | 11/2002 | Daggett ................. G06Q 10/10 705/4 |
| 2005/0114382 | A1* | 5/2005 | Lakshminarayan .... G06F 18/23 707/999.102 |
| 2006/0074560 | A1* | 4/2006 | Dyer ....................... G06Q 10/04 702/5 |
| 2015/0088606 | A1* | 3/2015 | Tyagi ................ G06Q 30/0202 705/7.31 |
| 2016/0157441 | A1* | 6/2016 | Esler .................. A01G 13/0237 43/124 |
| 2018/0020622 | A1* | 1/2018 | Richt ..................... G06Q 10/04 703/6 |
| 2018/0059691 | A1* | 3/2018 | Fleming .................. G06Q 50/02 |
| 2018/0070527 | A1* | 3/2018 | Richt .................. A01B 79/005 |
| 2018/0146631 | A1* | 5/2018 | Haran ................... A01G 25/167 |
| 2018/0300319 | A1* | 10/2018 | Burriesci ................ G06F 16/41 |
| 2019/0331832 | A1* | 10/2019 | Chandra ................. G01W 1/06 |
| 2019/0333207 | A1* | 10/2019 | Grant ..................... G06T 7/0002 |
| 2019/0339685 | A1 | 11/2019 | Cella et al. |
| 2019/0347836 | A1* | 11/2019 | Sangireddy ........... A01C 21/005 |

OTHER PUBLICATIONS

Daniela De Benedetto et al., "An approach for delineating homogenous zones by using multi-sensor data," Geoderma, May 2013, vol. 199, pp. 117-127, Elsevier, https://www.researchgate.net/publication/256716105_An_approach_for_delineating_homogenous_zones_by_using_multi-sensor_data/link/59be92b7a6fdcca8e56cb116/download.

Annamaria Castrignanò et al., "A Combined Approach of Sensor Data Fusion and Multivariate Geostatistics for Delineation of Homogeneous Zones in an Agricultural Field," Sensors, 2017, vol. 17 (12), MDPI, Link: https://www.mdpi.com/1424-8220/17/12/2794.

Viacheslav I. Adamchuk et al., "Sensor Fusion for Precision Agriculture," Sensor Fusion—Foundation and Applications, 2010, Research Gate, https://www.researchgate.net/publication/221913009_Sensor_Fusion_for_Precision_Agriculture/link/0deec51ccac2633679000000/download.

Rajalakshmi Krishnamurthi et al., "An Overview of IoT Sensor Data Processing, Fusion, and Analysis Techniques," Sensor, Oct. 2020, vol. 20 (21), MDPI, https://www.mdpi.com/1424-8220/20/21/6076.

Stefano Marino et al., "Detection of homogeneous wheat areas using multi-temporal UAS images and ground truth data analyzed by cluster analysis," European Journal of Remote Sensing, 2018 vol. 51, Issue: 1, pp. 266-275, Tandfonline, https://www.tandfonline.com/doi/pdf/10.1080/22797254.2017.1422280?needAccess=true.

Durai Raj Vincent et al., "Sensors Driven AI-Based Agriculture Recommendation Model for Assessing Land Suitability," Sensors, Date: 2019, vol. 19 (17), Publisher: MDPI, https://www.mdpi.com/1424-8220/19/17/3667.

Yemeserach Mekonnen, Review—Machine Learning Techniques in Wireless Sensor Network Based Precision Agriculture, Journal of The Electrochemical Society, 2020, IOP Science, https://iopscience.iop.org/article/10.1149/2.0222003JES/pdf.

* cited by examiner

METHOD AND SYSTEM FOR MICRO-CLIMATE MANAGEMENT

PRIORITY CLAIM

This U.S. patent application claims priority under 35 U.S.C. § 119 to: Indian Patent Application No. 202121029175, filed on 29 Jun. 2021. The entire contents of the aforementioned application are incorporated herein by reference.

TECHNICAL FIELD

The disclosure herein generally relates to agricultural systems, and, more particularly, to a method and system for micro-climate management in a land area being monitored.

BACKGROUND

Precision agriculture approach typically includes deployment of large stationary or portable wireless sensor networks to gather information like soil moisture, ambient weather conditions, and so on, which helps in determining climatic, soil related, and other factors that affect crop growth. This in turn helps in determining appropriate actions to be triggered to facilitate optimum health and yield of the crops.

However, interpreting sensor data and arriving at conclusions is a key challenge for various reasons. For example, consider some of the aspects as listed below.

1) In a huge open field (few hectares) many sensors often get deployed based on certain initial assumptions about the terrain and associated aspects. While multiple measurements are obtained from each sensor unit for a certain parameter (temperature), it is non-trivial for the user (or farmer) to conclude on how homogeneous or heterogeneous the parameter variation is, which is different from the number of sensors and their deployment pattern. Further the area of influence for each parameter is also different which affects the overall crop management and user decisions. In the same farm for example, the variation pattern of parameters such as but not limited to temperature, and humidity at one end could be very different when compared to temperature, humidity at another end due to difference in the elevation levels in the land area of the farm.
2) Logistic constraints, very often prevent sensors from being deployed pervasively and lead to deployments at a few select locations while the need exists to understand the microclimate of the entire region.
3) Due to technical and non-technical reasons such as hardware malfunction, power outages etc., there could be missing values in the sensor database. This can adversely affect accuracy of measurements, and in turn applications using the measured data.
4) In order to reduce the cost of investment, the sensors deployed in the field may not be expensive and rugged. This leads to reduction in reliability of the sensor values obtained such as the sensors having life for a short period of time. This also reduces the local forecast estimates using these values.
5) Forecasts for open farms without dedicated weather stations are usually made at regional level and which would differ from that at a micro (farm) level. With data coming from sensors, it is important to hyper-localize the micro-climate context for the farmer. Since essential services like pest and disease management etc. rely heavily on accurate ambient data, an accurate local context really helps these services.

SUMMARY

Embodiments of the present disclosure present technological improvements as solutions to one or more of the above-mentioned technical problems recognized by the inventors in conventional systems. For example, in one embodiment, a processor implemented method of micro-climate management is provided. In this method, initially sensor data with respect to ambient conditions and field conditions in a plurality of plots in a land area being monitored, are collected as input, using a plurality of sensors, via one or more hardware sensors. Further, all sensors from among the plurality of sensors, that are identified as following same trend in a trend analysis of the plurality of sensors, are grouped to generate one or more sensor groups, via the one or more hardware sensors. Further, a regrouping of the plurality of sensors forming the one or more sensor groups is performed to form one or more regrouped sensor groups, by iteratively performing the regrouping based on a determined homogeneity of the plurality of sensors forming the one or more sensor groups, via the one or more hardware sensors. Based on the regrouped sensor groups, a micro-climate view of the land area is generated, wherein generating the micro-climate view comprises grouping plots from among the plurality of plots, via the one or more hardware sensors, wherein the plots forming the micro-climate view are homogenous plots. Further, a micro-climate forecast of the ambient conditions in the land area being monitored is performed, for at least one future instance of time, based on the micro-climate view, via the one or more hardware sensors.

In another aspect, a system for micro-climate management is provided. The system includes one or more hardware processors, an I/O interface, and a memory storing a plurality of instructions. The plurality of instructions when executed, cause the one or more hardware processors to initially collect sensor data with respect to ambient conditions and field conditions in a plurality of plots in a land area being monitored, using a plurality of sensors. Further, the system identifies all sensors from among the plurality of sensors, that follow same trend in a trend analysis of the plurality of sensors, and the sensors following the same trend are grouped to generate one or more sensor groups. The system then regroups the plurality of sensors forming the one or more sensor groups to form one or more regrouped sensor groups, by iteratively performing the regrouping based on a determined homogeneity of the plurality of sensors forming the one or more sensor groups. Based on the regrouped sensor groups, a micro-climate view of the land area is generated by the system, wherein generating the micro-climate view comprises grouping plots from among the plurality of plots, wherein the plots forming the micro-climate view are homogenous plots. Further, a micro-climate forecast of the ambient conditions in the land area being monitored is performed by the system, for at least one future instance of time, based on the micro-climate view.

In yet another aspect, a non-transitory computer readable medium for micro-climate management is provided. The non-transitory computer readable medium includes a plurality of executable instructions, which when executed, cause one or more hardware processors to perform the micro-climate management involving the following steps. Initially sensor data with respect to ambient conditions and field conditions in a plurality of plots in a land area being monitored, are collected as input, using a plurality of sensors, via the one or more hardware sensors. Further, all sensors from among the plurality of sensors, that are identified as following same trend in a trend analysis of the plurality of sensors, are grouped to generate one or more sensor groups, via the one or more hardware sensors. Further, a regrouping of the plurality of sensors forming the one or more sensor groups is performed to form one or more regrouped sensor groups, by iteratively performing the regrouping based on a determined homogeneity of the plurality of sensors forming the one or more sensor groups, via the one or more hardware sensors. Based on the regrouped sensor groups, a micro-climate view of the land area is generated, wherein generating the micro-climate view comprises grouping plots from among the plurality of plots, via the one or more hardware sensors, wherein the plots forming the micro-climate view are homogenous plots. Further, a micro-climate forecast of the ambient conditions in the land area being monitored is performed, for at least one future instance of time, based on the micro-climate view, via the one or more hardware sensors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
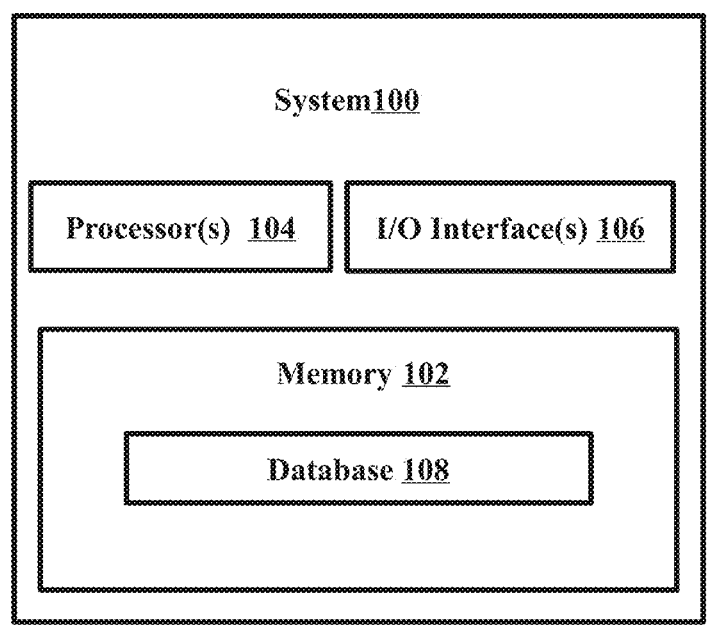
FIG. 1 illustrates an exemplary system for micro-climate management, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 8B, where similar reference characters denote corresponding features consistently throughout the figures, there are shown preferred embodiments and these embodiments are described in the context of the following exemplary system and/or method.

FIG. 1 illustrates an exemplary system for micro-climate management, according to some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores all data associated with the micro-climate management being performed by the system 100. For example, if the monitoring and micro-climate management performed over a period of time is considered as an instance of micro-climate management, the data such as but not limited to data such as but not limited to, sensor data, sensor groups identified post trend analysis, homogeneous plot groups, micro-climate view generated, results of micro-climate forecast and so on, corresponding to each instance, may be stored in the database 108. Additionally, the database may store a plurality of configurable instructions, which when executed, can cause the one or more hardware processors to perform all steps associated with the micro-climate management. Functions of the components of the system 100 are explained in conjunction with FIG. 2 through FIG. 4.

Figure 2:
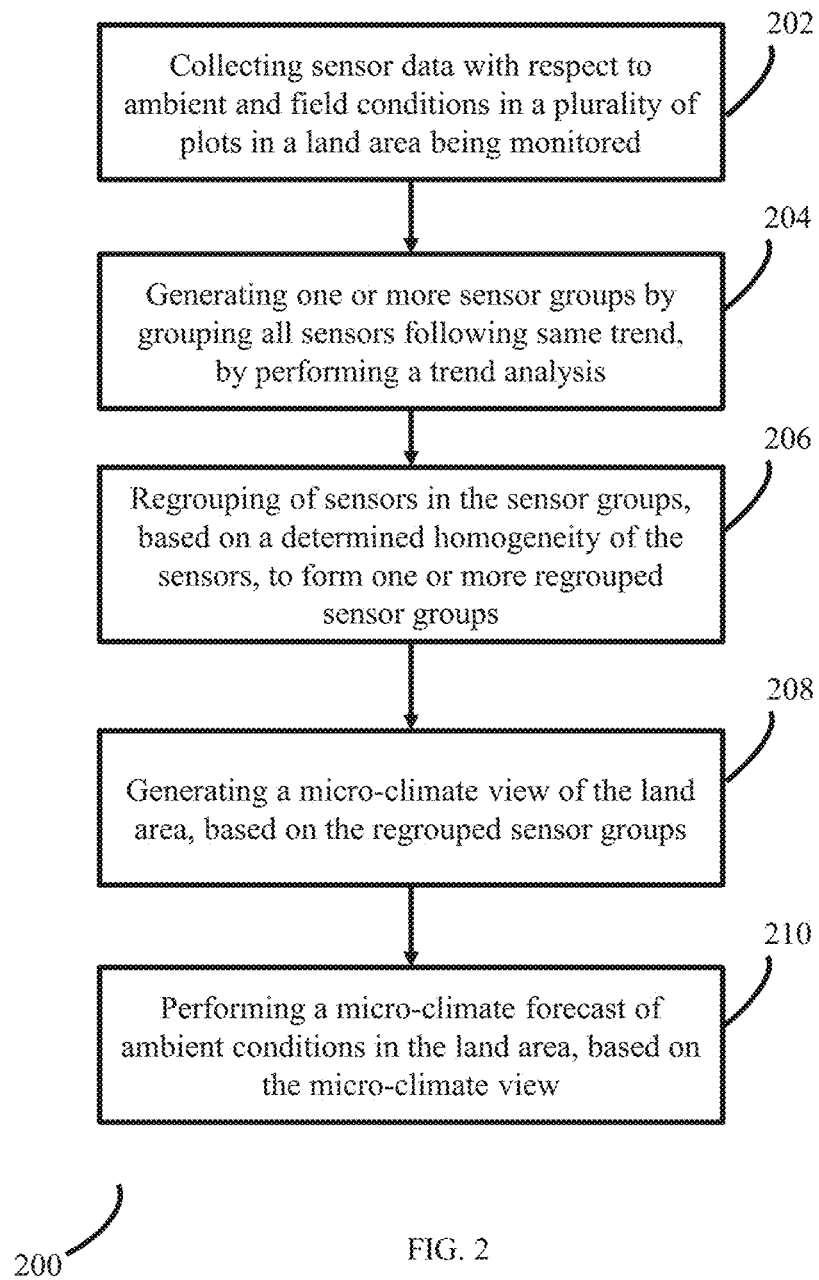
FIG. 2 is a flow diagram depicting steps involved in the process of the micro-climate management, by the system of FIG. 1, according to some embodiments of the present disclosure.

FIG. 2 is a flow diagram depicting steps involved in the process of the micro-climate management, by the system of FIG. 1, according to some embodiments of the present disclosure.

Figure 5A:
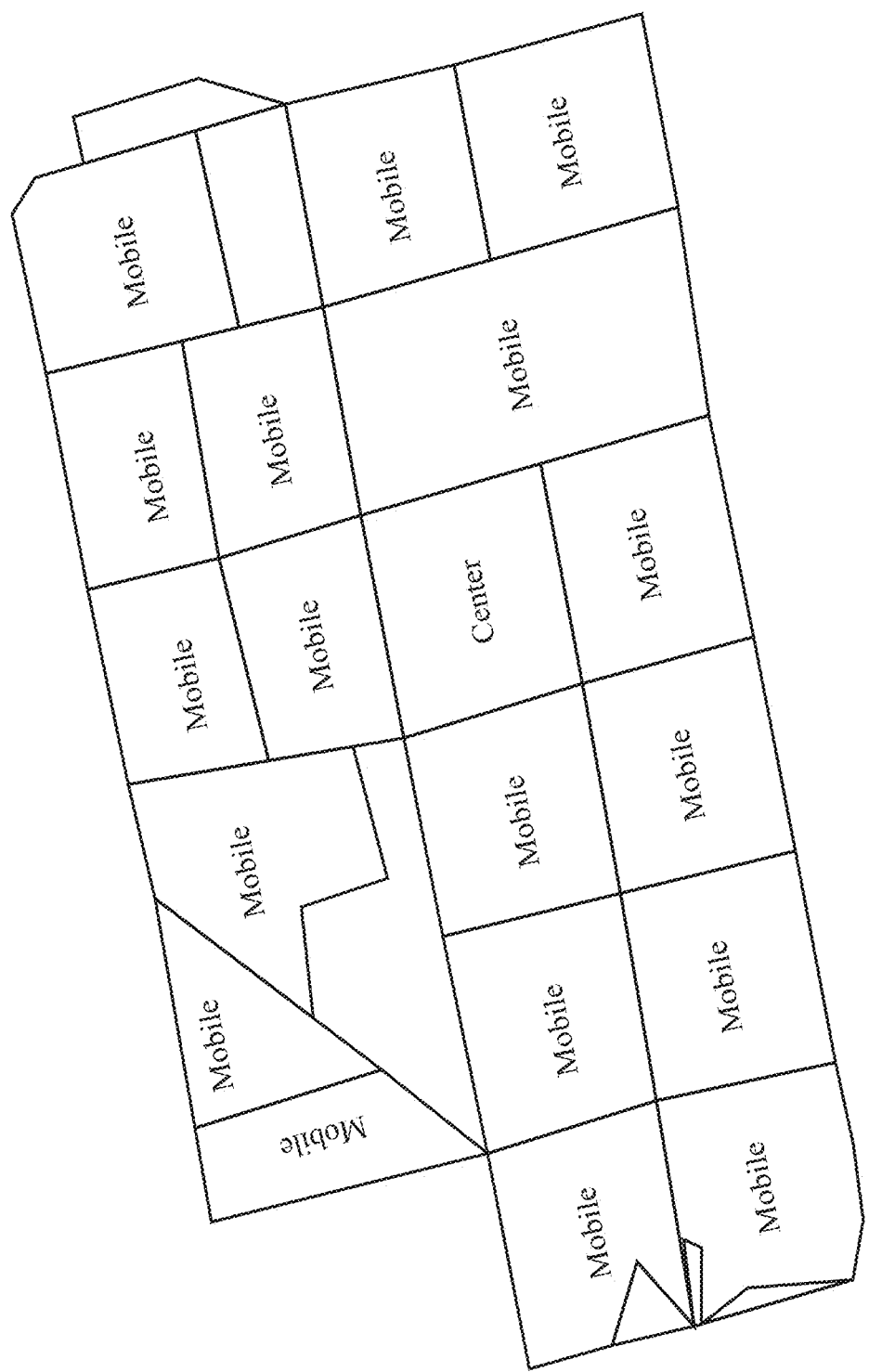
FIGS. 5A, 5B, 5C, and 5D illustrate example plots depicting different stages of the micro-climate management being performed by the system of FIG. 1, in accordance with some embodiments of the present disclosure.

To perform monitoring and the micro-climate management in a land area (which may be a farm), multiple sensors are to be deployed across the land area. For this purpose, the land area is considered to have been divided into a plurality of plots/segments (as in FIG. 5A). Further, each of the plots may be different from one another in terms of size (area), shape, elevation, and so on. This is depicted in FIG. 5A.

At step 202, the system 100 collects sensor data with respect to various ambient and field conditions in each of the plurality of plots. Placement of sensors in the context of the embodiments disclosed herein, and collection of data are explained below:

To achieve the micro-climate view of the entire farm, a fixed sensor node and multiple mobile sensors were used. The fixed sensor node was placed in a plot (plot P), wherein the plot P is at a location at approximate centre of the farm. The fixed sensor node is configured to capture data at pre-set intervals (for example, 5 minutes), from plot P, and this collected data may be stored in the database 108. In various embodiments, the database 108 is deployed in a local memory or in a cloud platform, as per implementation requirements. When the database is on a cloud platform, appropriate measures can be provided to facilitate upload of sensor data to the cloud platform, directly, or via any intermediate component.

In a typical scenario, data and conditions represented by the data from one plot may not be true for other plots due to differences such as change in elevation levels. For this purpose, homogeneity between plots need to be determined, and for this purpose, value of parameters representing the ambient condition in the plots are collected using multiple mobile sensors, which may be carried by field workers who visit different plots on different days for field operations like pruning, harvesting and so on. Data collected by the mobile sensors also are uploaded to the database 108, either in real-time or at a pre-defined interval (for example, every 5 mins). In case of issues such as network connectivity failure, the measured data may be temporarily stored in the sensors and may be uploaded when the connectivity is re-established. Similarly, data is collected from other plots as well, on respective days.

Each worker visiting different plots may carry set of mobile sensors. For example, consider that a worker W1 visits a plot P1 on a particular day-say every Monday of that month. This way W1 would visit P1 4 times (4 Mondays) in that month. Similarly, a worker W2 visits a plot P2 every Monday for that month. In this way, multiple plots get covered in a day. Consider that the ambient data being measured by the mobile sensors is temperature. By collecting data in this manner, the temperature data from all the plots is obtained using the mobile sensors that were visited on Mondays for that month. In a similar fashion, data from different plots on different days of the week are obtained. The entire farm is covered using multiple such mobile sensors. An example of the data collection is depicted in Table. 1.

TABLE 1

| | | |
|---|---|---|
| Monday | W1 | P1 |
| | W2 | P2 |
| | W3 | P3 |
| Tuesday | W1 | P4 |
| | W2 | P5 |
| | W3 | P6 |
| Wednesday | W1 | P7 |
| | W2 | P8 |
| | W3 | P9 |
| . | . | . |
| . | . | . |
| . | . | . |
| Sunday | W1 | P19 |
| | W2 | P20 |
| | W3 | P21 |

As depicted in Table. 1, 3 workers with mobile sensors covered 21 plots in a week and followed the same pattern for the rest of the month. Eventually, 21 plots were visited 4 times in a month by 3 workers. Based on mobile GPS data, it can be inferred from which plot the mobile sensor data is received.

The data may be collected continuously for a fixed time period before it is processed to perform the micro-climate management. For example, the fixed time period is one month from the day the data collection has begun. In an embodiment, the data processing may be manually invoked at any point of time, using appropriate interface and options provided to an authorized user.

The fixed sensor node may have multiple sensors to measure parameters such as but not limited to temperature, humidity, soil moisture, and luminosity. This fixed sensor node may fetch data (N1{sa, sb, . . . , sn}) from all the sensors connected to it. Mobile sensors also capture multiple parameters (Mn{sa, sb, . . . , sn}) like temperature, humidity, luminosity & so on and transmits to the database 108.

After collecting all the data {N1, M1, M2, . . . , Mn} from the fixed sensor node and multiple mobile sensors, the collected data may be pre-processed by the system 100. For explanation purpose, only temperature values are considered, and time for which the data is collected is considered to be one month. There is one month data of N1 from plot P and weekday wise data of M1, M2, . . . & Mn from multiple different plots (P1, P2, . . . , Pn) on a particular day of the week. The system 100 divides the fixed sensor data (N1) of plot P into different days of the week and clubs the data from all the similar days of the week (Eg: club all the data received on Monday). This allows comparison of N1 of plot P with M1, M2, . . . , & Mn received from multiple different plots (P1, P2, . . . , Pn) on a particular day of the week, which in turn allows grouping of data from N1 and the multiple mobile sensors. By virtue of this comparison, the sensors providing homogeneous data may be identified. An example of the storage of data from different plots is depicted in Table. 2.

TABLE 2

| Plot | Sensor data |
|---|---|
| P | N1 |
| P1 | M1 |
| P2 | M2 |
| . | |
| Pn | Mn |

Figure 3:
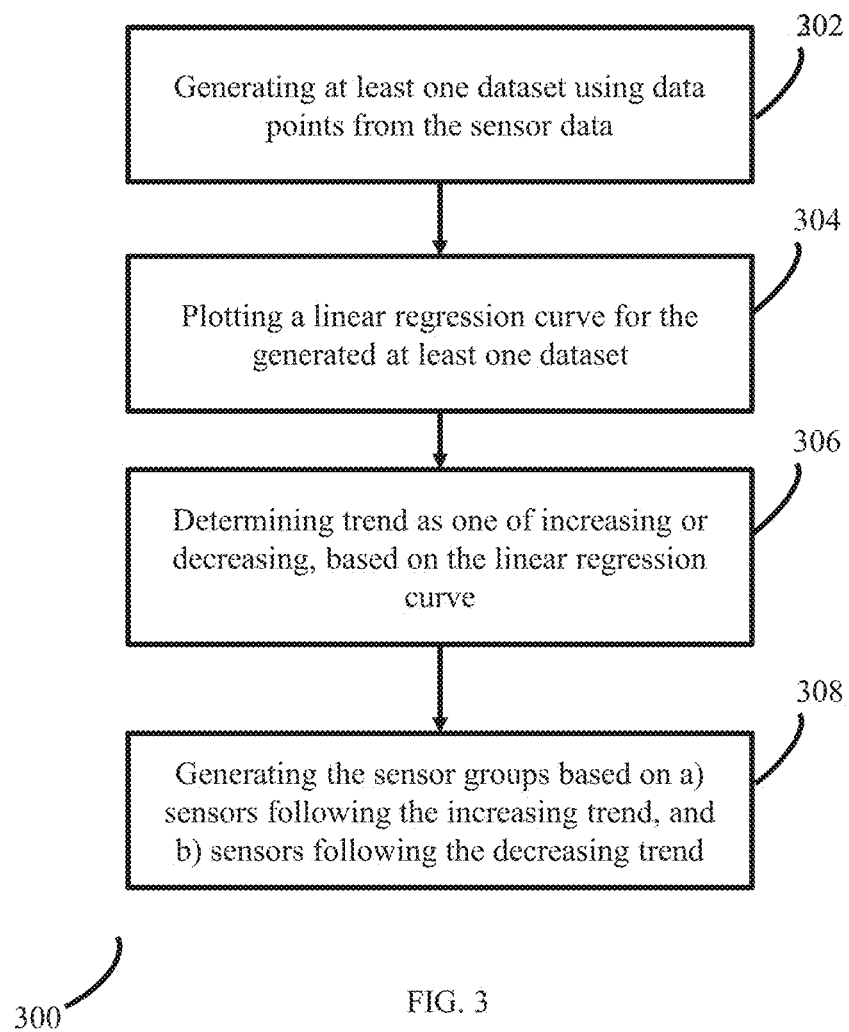
FIG. 3 is a flow diagram depicting steps involved in the process of trend analysis performed by the system of FIG. 1, according to some embodiments of the present disclosure.

Further, at step 204, the system 100 performs a trend analysis on the collected sensor data. The trend analysis is performed to identify trend being followed by different sensors. Various steps involved in the process of the trend analysis are depicted in FIG. 3. The sensor values (of different parameters being monitored by the sensors) are used as input to perform the trend analysis. For the purpose of explaining the trend analysis, an assumption made is that the parameter being measured is temperature. For example, the temperature sensor values from N1 (the fixed sensor node) on a particular day, and temperature sensor values from the mobile sensors M1, M2, . . . , Mn on the same day are collected and evaluated. During this evaluation, at step 302, the system 100 generates at least one dataset by using a plurality of data points extracted from the sensor data. Further, at step 304, the system 100 plots a linear regression curve (Similar to the plot in FIG. 6) for the collected sensor data, for both N1 as well as Mn, using the data in the at least one dataset. The system 100 may use any suitable linear regression equation to plot the linear regression curve, and further, by checking the plotted linear regression curve, the system 100 determines the trend as one of a) increasing, orb) decreasing, at step 306. If both N1 and Mn are identified as having same trend, the system 100 categorizes the corresponding sensors as following the same trend. The system 100 then groups the sensors that have been identified as having the same trend, to generate one or more sensor groups, at step 308. For example, all the sensors having the same trend form a sensor group. This may in turn represent similarity of each of the plots with the plot P, and hence may be an indication of plots that are similar to P and those which are different from the plot P.

For example, consider that there are total 21 plots (P1, P2, . . . , P21) in the land area being monitored. The sensor groups that may be formed post the trend analysis are given as:

G1: —Similar {P1, P4, P6, P7, P8, P9, P10, P12, P13, P14, P16, P17, P19, P20, P21}

G2: —Different {P2, P3, P5, P11, P15, P18}

Figure 5B:
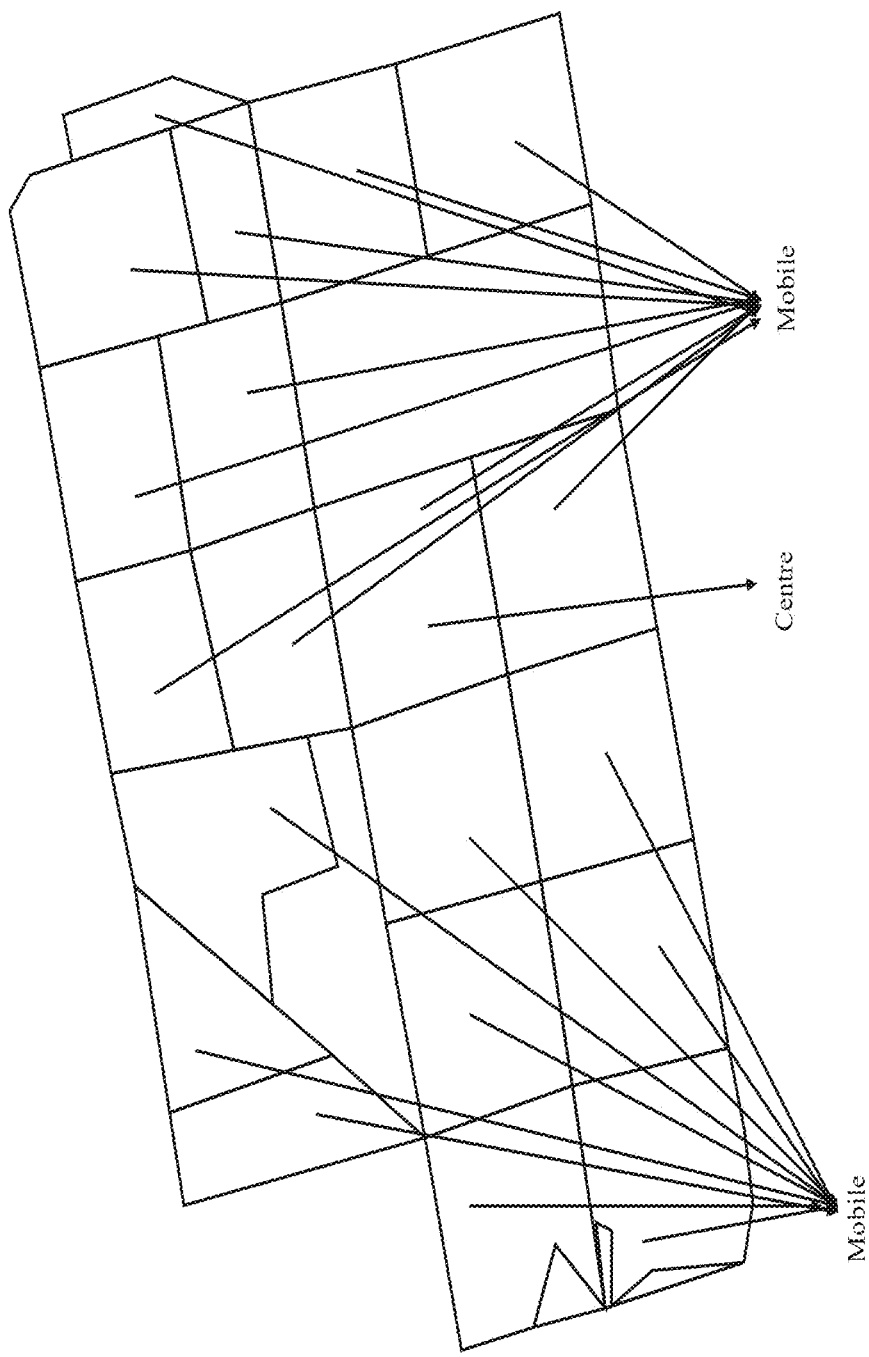

In this example, the plots in G1 group are similar to plot P as they show same trend as that of P, whereas the plots in G2 group are different from that of plot P as they show different trend from the trend of P. An example of the plots grouped after the trend analysis is depicted in FIG. 5B.

Further, at step 206, the system 100 performs a homogeneity check of the sensors in group G1 (i.e. the sensors identified as following same trend and is similar to that of plot P). The system 100 may use any suitable technique or a combination of techniques, to perform the homogeneity check. For explanation purpose, a combination of ANOVA test and Spearman Rank Correlation Test (Pairwise Test) is used to explain the homogeneity check being performed by the system 100. It is to be noted that any suitable technique (or combination of any suitable techniques) may be used, and the description provided herein does not intend to limit the scope of the embodiments disclosed herein. Also, the foregoing considers only two groups (G1 and G2) for example purpose only. In different scenarios or different implementations, the number of groups also may vary, when the trend is determined based on any aspect other than 'increasing/decreasing' or any other similar aspects.

ANOVA Test:

The input to perform the ANOVA test are the two groups (G1 & G2) formed after the trend analysis. In an embodiment, both the groups are analyzed separately. The system 100 performs the ANOVA test on G1 & G2 to further check if they are homogeneous within themselves or not. For the analysis associated with the ANOVA test, a null hypothesis is defined as all the plots in the group are homogeneous. After the ANOVA test is done, resulting p-value is checked to determine if the p-value is exceeding a pre-defined 'significance value'. In an embodiment, value of the 'significance value' is pre-configured and may be changed as per requirements. If the p-value is identified as below the significance value, then it indicates that the entire group of plots is not homogeneous (reject the null hypothesis) otherwise the whole group of plots is homogeneous. A few sample values of the result of the ANOVA test for G1 can be seen in Table. 3. When the p-value is less than the significance value, the system 100 rejects the null hypothesis and marks G1 as non-homogeneous. A similar test done for G2 also results in failure of the null hypothesis, as G2 is a non-homogeneous cluster.

TABLE 3

| Ambient temperature (in degree Celsius) | |
| --- | --- |
| Statistic | 274.256 |
| Pvalue | 0.00000 |

B) Spearman Rank Correlation Test (Pairwise Test)

When a group G1 or G2 fails the ANOVA test, it then goes through the pairwise test. This step checks for homogeneity of each plot individually with all the other plots in that group. From the ANOVA results, group G1 failed the ANOVA test. Since G1 is the similar group, all the plots (P1, P4, P6, P7, P8, P9, P10, P12, P13, P14, P16, P17, P19, P20, P21) are to be individually checked for homogeneity with plot P. Group G2 also failed ANOVA, hence, all the plots (P2, P3, P5, P11, P15, P18) in that group would be checked for homogeneity among them and not with plot P. The Spearman Rank Correlation (as in Equation. 1) is used to perform the pairwise test and declare the plots homogeneous. A threshold for Spearman Rank Correlation coefficient (ρ) can be kept as an appropriate value. For example, 0.8. If the correlation coefficient of the pairwise test between two plots comes out to be >=0.8 (i.e., the correlation coefficient of the pairwise test exceeding the Spearman Rank Correlation coefficient), then the plots are marked as homogeneous, else as non-homogeneous.

$$\vartheta = 1 - \frac{6 \sum d_i^2}{n(n^2 - 1)} \quad (1)$$

Where ϑ is Spearman's rank correlation coefficient, $d_i$=difference between the two ranks of each observation, n=number of observations The results of pairwise test on group G1 can be seen in Table. 4. As in Table. 4, from group G1: —P1, P6, P7, P8, P9, P10, P13, P16, P17 & P21 have passed the threshold and hence are marked as homogeneous to plot P whereas, P4, P12, P14, P19 & P20 have failed the pairwise test and are marked as non-homogeneous to plot P, by the system 100. Since P4, P12, P14, P19 & P20 are non-homogeneous to group G1, they form a different homogeneous group (G3).

TABLE 4

| Pair-wise comparison with node/plot P | Spearman's correlation coefficient |
| --- | --- |
| 1 | 0.915550 |
| 4 | 0.788167 |
| 6 | 0.817560 |
| . | . |
| 21 | 0.850181 |

Similarly, the pair-wise test for G2 as well. The results are shown in Table. 5. The plots P3, P5, P11, P15 & P18 are homogeneous with each other but P2 is not passing the test with P11, P15 & P18 but passing with P3 & P5. In such scenarios, the system 100 may determine a probability score to categorize P2 as homogeneous or nonhomogeneous. The probability score is calculated by dividing the total number of cases P2 passed the homogeneous criteria by total number cases overall. If the probability of P2 being homogeneous with other plots is equal to or exceeding a set threshold, then P2 is categorized as homogeneous. If P2 is determined as having the probability score below the threshold, then the system 100 marks P2 as non-homogeneous, and may accordingly discard P2. Therefore, P2 is removed from the group to form a different homogeneous group (G4).

TABLE 5

| Pair-wise comparison with node/plot P | Spearman's correlation coefficient |
|---|---|
| 2-3 | 0.879440 |
| 2-5 | 0.904857 |
| 2-11 | 0.438148 |
| . | . |
| 15-18 | 0.905417 |

The above process would be followed for G3 again to check if any plot is nonhomogeneous in that group. G3 failed the ANOVA test, indicating that there is minimum 1 plot that is non-homogeneous to the group. By doing the pair-wise, the different group that the non-homogeneous plot. The results of pair-wise test can be seen in Table. 6. It can be observed that P14 fails the pairwise test and forms a separate group of its own i.e., G5. The same can be seen from FIG. 5B.

TABLE 6

| Pair-wise comparison with node/plot P | Spearman's correlation coefficient |
|---|---|
| 4-12 | 0.917212 |
| 4-14 | 0.660283 |
| 4-19 | 0.850881 |
| . | . |
| 19-20 | 0.882439 |

Figure 5C:
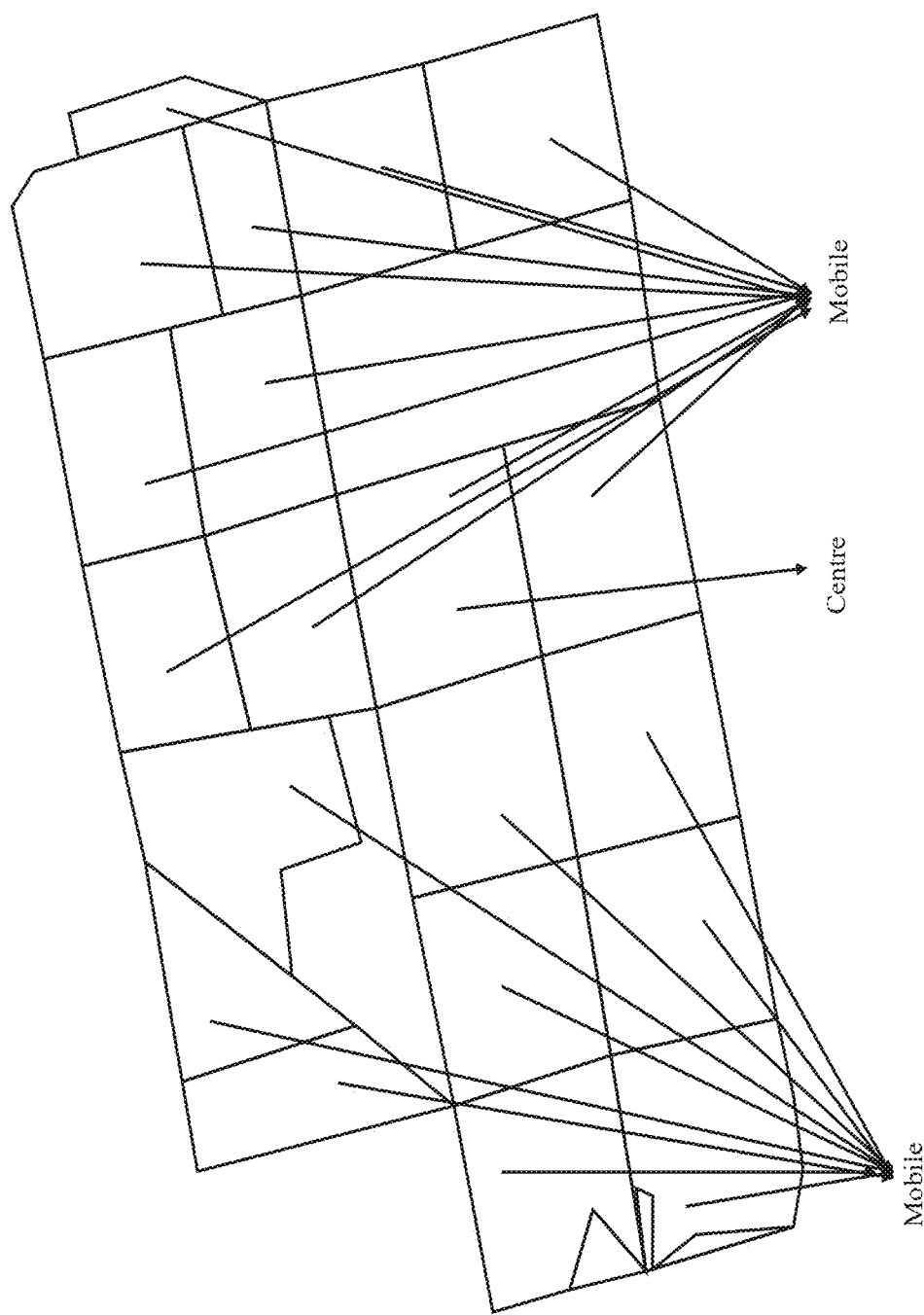
Figure 5D:
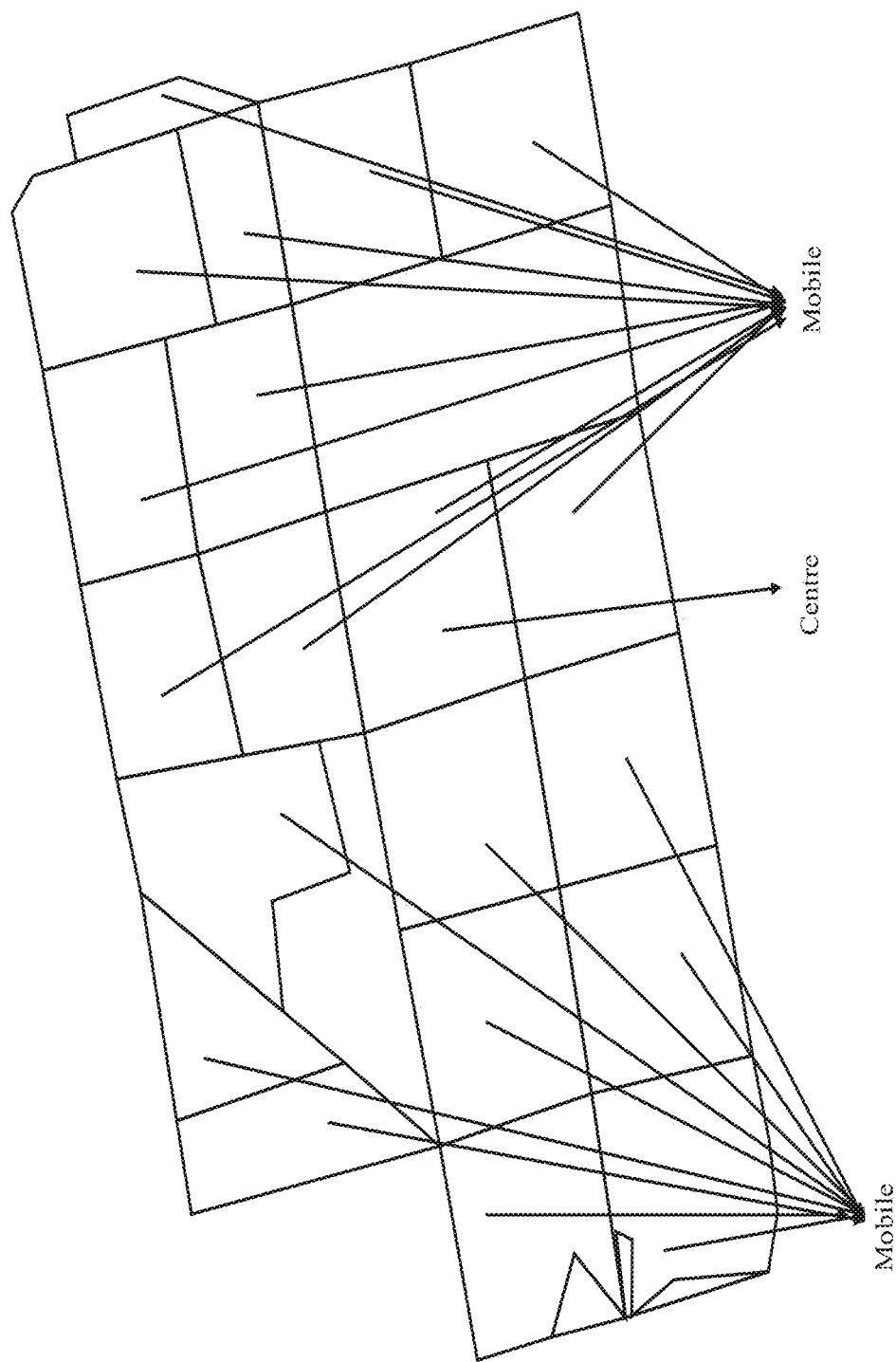
Figure 6:
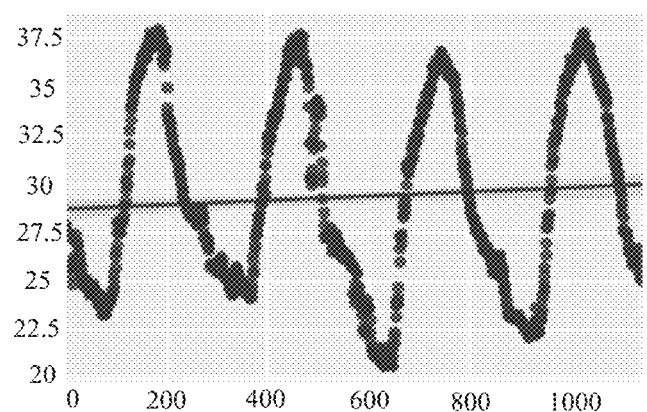
FIG. 6 is an example of linear regression curve plotted for the trend analysis by the system of FIG. 1, according to some embodiments of the present disclosure.

This process is repeated till all the plots are grouped. An example of the homogeneous grouping of plots is depicted in FIG. 5C.

The regrouped sensor groups thus formed at step 206 together form the micro-climate view of the land area, at step 208 (for example, as given in FIG. 5D). in an embodiment, the micro-climate view indicates the different groups of homogeneous plots, such that the plots in different homogeneous groups have unique characteristics in terms of the ambient conditions and field conditions.

Figure 4:
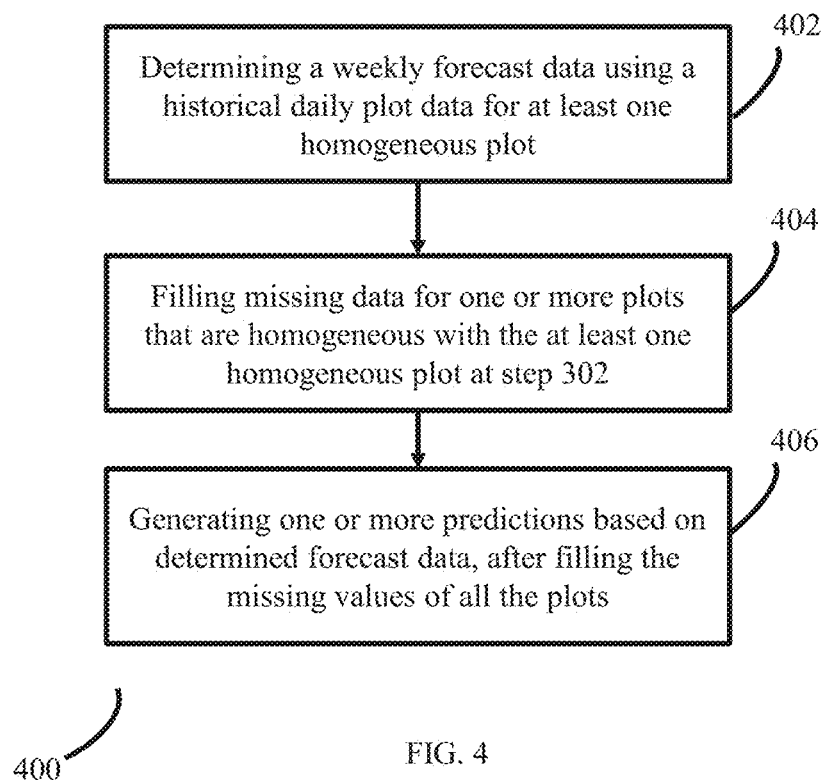
FIG. 4 is a flow diagram depicting steps involved in the process of generating micro-climate forecast by the system of FIG. 1, according to some embodiments of the present disclosure.

Further, at step 210, the system 100 performs a micro-climate forecast based on the generated micro-climate view. Various steps involved in the process of performing the micro-climate forecast are depicted in FIG. 4.

Objective of the micro-climate forecast is to forecast selected ambient parameters for a selected time duration (a few days into the future), by synthesizing local sensor information for those parameters. As the plots in each homogeneous group are homogeneous to each other, values estimated for one plot in the group may be extended for other plots in the same group, thus achieving a much wider spatio-temporal coverage.

At step 402, the system 100 calculates a weekly forecast (F1, F2, . . . , Fn) of the homogeneous groups (G1, G2, . . . , Gn) using an appropriate time series forecasting method (such as ARIMA), using the historical daily plot data (N1, M1, M2, . . . , Mn). The time period of historical data may be pre-configured. For the purpose of explanation, data collected over a period of one month is used as the historical homogeneous group data, for the weekly forecast. Further, using temperature parameter as an example, $F_n$ typically gives a forecast measurement per day for a week for say group G. Due to technical glitch, power outage and other reasons there may be cases where a homogeneous group (say group G1) has missing data on few days. This may affect accuracy of a time series forecasting model due to reduction in data points.

At step 404, the system 100 fills the missing data for group G1 by fusing the weather data from adjacent two homogeneous groups (say G2 & G3) using a suitable technique (for example, Inverse Distance Weighting (IDW) method) to get a reliable forecast weather data for group G1.

At step 406, the system 100 Generating one or more predictions based on determined forecast data, after filling the missing values of all the plots. An interpolation method may be used by the system 100 for this purpose. A general form of finding an interpolated value u at a given point x based on samples ui=u(xi) for i=1, 2, . . . , N using IDW is an interpolating function:

$$u(x) = \frac{\sum_{i=1}^{N} w_i(x) u_i}{\sum_{i=1}^{N} w_i(x)}$$

where $$w_i(x) = \frac{1}{d(x, x_i)}$$

is an IDW weighting function, x denotes an interpolated (arbitrary) point, $x_i$ is an interpolating (known) point, d is a given distance from the known point $x_i$ to the unknown point x, N is the total number of known points used in interpolation. This helps to factor in the distance between the group G1 and G2, G3 of the farm.

The graphs (FIGS. 8A, 8B) show the maximum and minimum temperature variation for a week. Temperature values of the adjacent groups G2 & G3 and the interpolated temperature value for group G1. This further helps the users interpret the data well.

Figure 7:
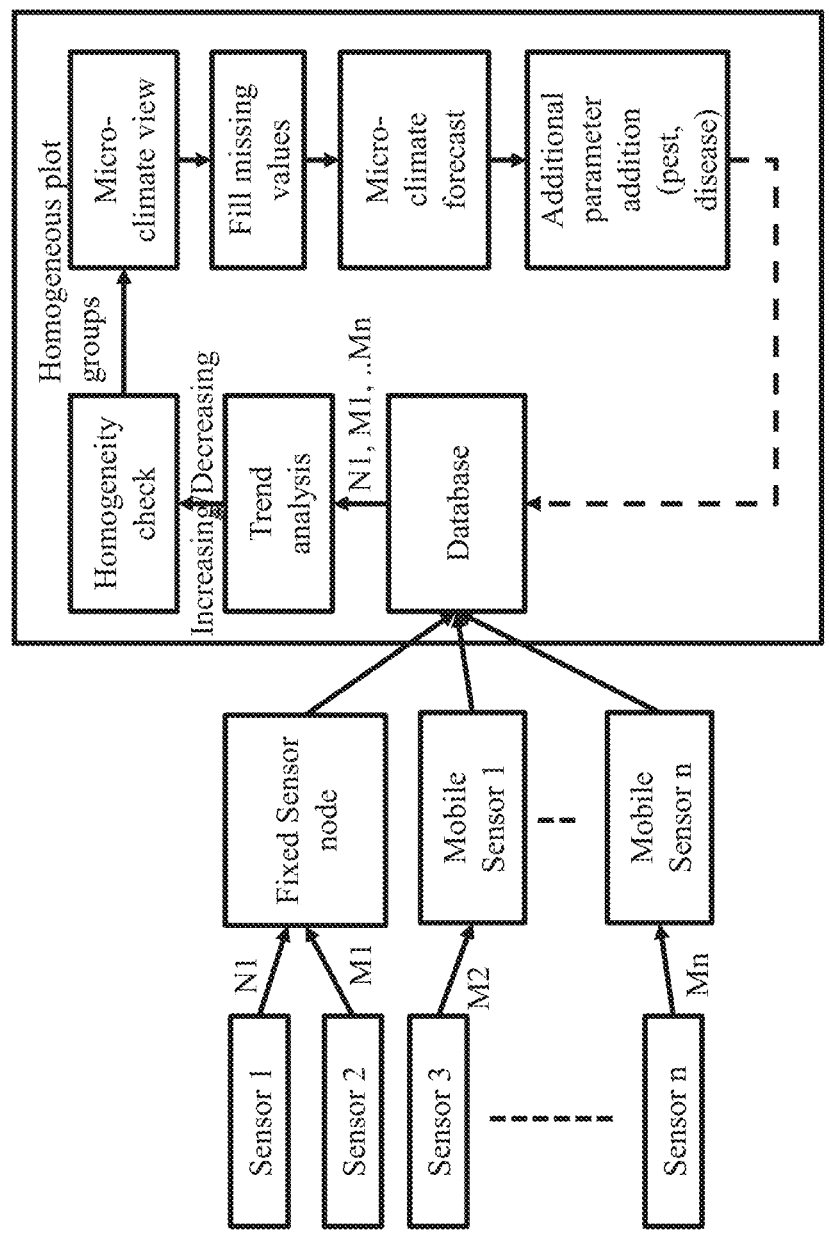
FIG. 7 is a functional flow diagram of the system of FIG. 1 for performing the micro-climate management, in accordance with some embodiments of the present disclosure.
Figure 8A:
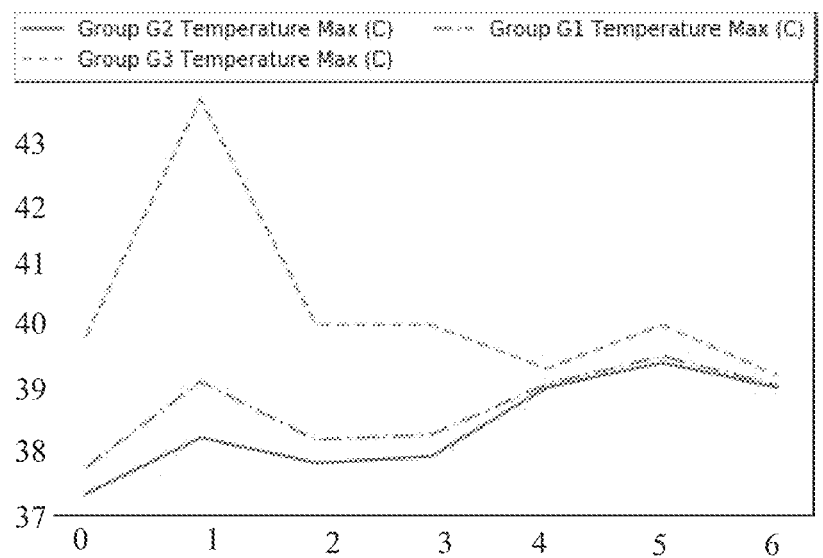
FIGS. 8A and 8B are example graphical representations of data generated using the micro-climate forecast, by the system of FIG. 1, according to some embodiments of the present disclosure.
Figure 8B:
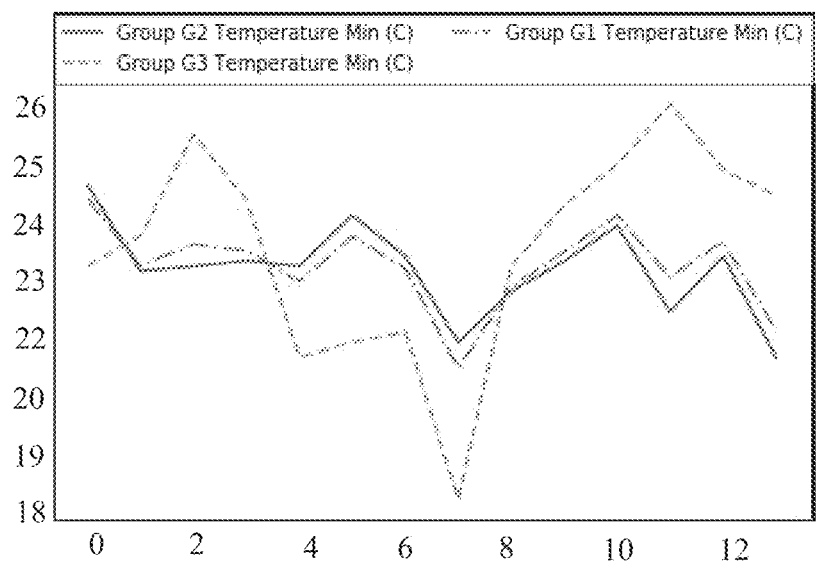

The steps in method 200 may be performed in the same order as depicted in method 200, or in any alternate order that is technically feasible. A functional flow of data of the method 200 is depicted in FIG. 7.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of micro-climate management by considering differences in characteristics of different plots in a land area being monitored. The embodiment thus provides a mechanism of grouping different plots based on homogeneity of sensors deployed across the plots to generate a micro-climate view of the land area. Moreover, the embodiments herein further provide a mechanism of generating micro-climate forecast using the generated micro-climate view.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of micro-climate management, comprising:
    collecting sensor data with respect to ambient conditions and field conditions in a plurality of plots in a land area being monitored, using a plurality of sensors, via one or more hardware sensors, wherein the plurality of sensors comprises a plurality of mobile sensors, and at least one fixed sensor node, wherein the at least one fixed sensor node is associated with a plurality of ambient sensors, wherein the at least one fixed sensor node is placed in a plot P, and wherein the plot P is at a location at an approximate centre of a farm;
    grouping all sensors from among the plurality of sensors, that are identified as following same trend in a trend analysis of the plurality of sensors, to generate one or more sensor groups, via the one or more hardware sensors, wherein the trend analysis comprises:
        generating at least one dataset, wherein the generated at least one dataset comprising a plurality of data points extracted from the sensor data;
        plotting a linear regression curve for the generated at least one dataset;
        determining the trend as one of increasing or decreasing, for the ambient conditions in the collected sensor data; and
        generating the one or more sensor groups, based on the determined trend,
    wherein the one or more sensor groups includes group G1 and/or group G2 generated by performing the trend analysis, plots in the group G1 are similar to the plot P with the same trend as that of the plot P and plots in the group G2 are different from that of the plot P with different trend from the trend of the plot P;
    performing regrouping of the plurality of sensors forming the one or more sensor groups to form one or more regrouped sensor groups, by iteratively performing the regrouping based on a determined homogeneity of the plurality of sensors forming the one or more sensor groups, via the one or more hardware sensors, wherein the one or more regrouped sensor groups are formed by performing a homogeneity check of the plurality of sensors forming the one or more sensor groups using a combination of an Analysis of Variance (ANOVA) test and a Spearman Rank Correlation Test techniques, wherein the ANOVA test on the one or more sensor groups to check if the one or more sensor groups are homogeneous within themselves or not and after the ANOVA test is done, resulting p-value is checked to determine if the p-value is exceeding a pre-defined value and if the p-value is identified as below the pre-defined value, then an entire group of plots is not homogeneous and rejects a null hypothesis, otherwise the entire group of plots is homogeneous, wherein when the one or more sensor groups fails the ANOVA test, then the Spearman Rank Correlation Test is performed on the one or more sensor groups to check for homogeneity of each plot individually with all other plots in the one or more sensor groups, wherein a Spearman Rank Correlation is used to perform the Spearman Rank Correlation Test and declare the plots homogeneous;

generating a micro-climate view of the land area, wherein generating the micro-climate view comprises grouping plots from among the plurality of plots, based on the regrouped sensor groups, via the one or more hardware sensors, wherein the plots forming the micro-climate view are homogenous plots, and wherein the micro-climate view indicates different groups of homogeneous plots in a way that the plots in different homogeneous groups have unique characteristics in terms of the ambient conditions and field conditions; and performing a micro-climate forecast of the ambient conditions in the land area being monitored, for at least one future instance of time, based on the micro-climate view, via the one or more hardware sensors, wherein performing the micro-climate forecast comprises:
  determining, using a time series forecasting process, a weekly forecast data using a historical daily plot data for at least one homogenous plot from among a plurality of homogenous plots forming the micro-climate view;
  filling missing data for one or more plots that are homogenous with the at least one homogenous plot for which the weekly forecast data has been determined, as forecast data; and
  generating one or more predictions based on the determined forecast data.

2. A system for micro-climate management, comprising:
one or more hardware processors;
an I/O interface; and
a memory storing a plurality of instructions, wherein the plurality of instructions when executed, cause the one or more hardware processors to:
  collect sensor data with respect to ambient conditions and field conditions in a plurality of plots in a land area being monitored, using a plurality of sensors, wherein the plurality of sensors comprises a plurality of mobile sensors, and at least one fixed sensor node, wherein the at least one fixed sensor node is associated with a plurality of ambient sensors, wherein the at least one fixed sensor node is placed in a plot P, and wherein the plot P is at a location at an approximate centre of a farm;
  group all sensors from among the plurality of sensors, that are identified as following same trend in a trend analysis of the plurality of sensors, to generate one or more sensor groups, wherein the trend analysis comprises:
    generating at least one dataset, wherein the generated at least one dataset comprising a plurality of data points extracted from the sensor data;
    plotting a linear regression curve for the generated at least one dataset;
    determining the trend as one of increasing or decreasing, for the ambient conditions in the collected sensor data; and
    generating the one or more sensor groups, based on the determined trend,
  wherein the one or more sensor groups includes group G1 and/or group G2 generated by performing the trend analysis, plots in the group G1 are similar to the plot P with the same trend as that of the plot P and plots in the group G2 are different from that of the plot P with different trend from the trend of the plot P;
  perform regrouping of the plurality of sensors forming the one or more sensor groups to form one or more regrouped sensor groups, by iteratively performing the regrouping based on a determined homogeneity of the plurality of sensors forming the one or more sensor groups, wherein the one or more regrouped sensor groups are formed by performing a homogeneity check of the plurality of sensors forming the one or more sensor groups using a combination of an Analysis of Variance (ANOVA) test and a Spearman Rank Correlation Test techniques, wherein the ANOVA test on the one or more sensor groups to check if the one or more sensor groups are homogeneous within themselves or not and after the ANOVA test is done, resulting p-value is checked to determine if the p-value is exceeding a pre-defined value and if the p-value is identified as below the pre-defined value, then an entire group of plots is not homogeneous and rejects a null hypothesis, otherwise the entire group of plots is homogeneous, wherein when the one or more sensor groups fails the ANOVA test, then the Spearman Rank Correlation Test is performed on the one or more sensor groups to check for homogeneity of each plot individually with all other plots in the one or more sensor groups, wherein a Spearman Rank Correlation is used to perform the Spearman Rank Correlation Test and declare the plots homogeneous;
  generate a micro-climate view of the land area, wherein generating the micro-climate view comprises grouping plots from among the plurality of plots, based on the regrouped sensor groups, wherein the plots forming the micro-climate view are homogenous plots, and wherein the micro-climate view indicates different groups of homogeneous plots in a way that the plots in different homogeneous groups have unique characteristics in terms of the ambient conditions and field conditions; and
  perform a micro-climate forecast of the ambient conditions in the land area being monitored, for at least one future instance of time, based on the micro-climate view, wherein performing the micro-climate forecast comprises:
    determining, using a time series forecasting process, a weekly forecast data using a historical daily plot data for at least one homogenous plot from among a plurality of homogenous plots forming the micro-climate view;
    filling missing data for one or more plots that are homogenous with the at least one homogenous plot for which the weekly forecast data has been determined, as forecast data; and
    generating one or more predictions based on the determined forecast data.

3. One or more non-transitory machine-readable information storage mediums comprising one or more instructions which when executed by one or more hardware processors cause:
  collecting sensor data with respect to ambient conditions and field conditions in a plurality of plots in a land area being monitored, using a plurality of sensors, wherein the plurality of sensors comprises a plurality of mobile sensors, and at least one fixed sensor node, wherein the at least one fixed sensor node is associated with a plurality of ambient sensors, wherein the at least one fixed sensor node is placed in a plot P, and wherein the plot P is at a location at an approximate centre of a farm;

grouping all sensors from among the plurality of sensors, that are identified as following same trend in a trend analysis of the plurality of sensors, to generate one or more sensor groups, wherein the trend analysis comprises:
  generating at least one dataset, wherein the generated at least one dataset comprising a plurality of data points extracted from the sensor data;
  plotting a linear regression curve for the generated at least one dataset;
  determining the trend as one of increasing or decreasing, for the ambient conditions in the collected sensor data; and
  generating the one or more sensor groups, based on the determined trend, wherein the one or more sensor groups includes group G1 and/or group G2 generated by performing the trend analysis, plots in the group G1 are similar to the plot P with the same trend as that of the plot P and plots in the group G2 are different from that of the plot P with different trend from the trend of the plot P;

performing regrouping of the plurality of sensors forming the one or more sensor groups to form one or more regrouped sensor groups, by iteratively performing the regrouping based on a determined homogeneity of the plurality of sensors forming the one or more sensor groups, wherein the one or more regrouped sensor groups are formed by performing a homogeneity check of the plurality of sensors forming the one or more sensor groups using a combination of an Analysis of Variance (ANOVA) test and a Spearman Rank Correlation Test techniques, wherein the ANOVA test on the one or more sensor groups to check if the one or more sensor groups are homogeneous within themselves or not and after the ANOVA test is done, resulting p-value is checked to determine if the p-value is exceeding a pre-defined value and if the p-value is identified as below the pre-defined value, then an entire group of plots is not homogeneous and rejects a null hypothesis, otherwise the entire group of plots is homogeneous, wherein when the one or more sensor groups fails the ANOVA test, then the Spearman Rank Correlation Test is performed on the one or more sensor groups to check for homogeneity of each plot individually with all other plots in the one or more sensor groups, wherein a Spearman Rank Correlation is used to perform the Spearman Rank Correlation Test and declare the plots homogeneous;

generating a micro-climate view of the land area, wherein generating the micro-climate view comprises grouping plots from among the plurality of plots, based on the regrouped sensor groups wherein the plots forming the micro-climate view are homogenous plots, and wherein the micro-climate view indicates different groups of homogeneous plots in a way that the plots in different homogeneous groups have unique characteristics in terms of the ambient conditions and field conditions; and performing a micro-climate forecast of the ambient conditions in the land area being monitored, for at least one future instance of time, based on the micro-climate view, wherein performing the micro-climate forecast comprises:
  determining, using a time series forecasting process, a weekly forecast data using a historical daily plot data for at least one homogenous plot from among a plurality of homogenous plots forming the micro-climate view;
  filling missing data for one or more plots that are homogenous with the at least one homogenous plot for which the weekly forecast data has been determined, as forecast data; and
  generating one or more predictions based on the determined forecast data.

* * * * *